United States Patent [19]

Fabiani et al.

[11] 4,240,742
[45] Dec. 23, 1980

[54] CONTINUOUS PHOTOSENSITIVE SUPPORT PRESENTING A SPATIAL LAP DISSOLVE, ITS APPLICATION, A PROCESS FOR OBTAINING IT AND A DEVICE FOR IMPLEMENTING THE PROCESS

[76] Inventors: Henri Fabiani, 39 Avenue du Général Leclerc, 92100 Boulogne; Alain Bret, 108 rue de Garches, 92210 Saint-Cloud, both of France

[21] Appl. No.: 958,729

[22] Filed: Nov. 8, 1978

[30] Foreign Application Priority Data

Sep. 11, 1977 [FR] France ............................ 77 33702

[51] Int. Cl.³ ........................................... G03B 27/44
[52] U.S. Cl. .................................. 355/46; 352/91 R; 355/54; 355/71; 355/77
[58] Field of Search ..................... 355/46, 77, 71, 40, 355/54; 352/91 R

[56] References Cited

U.S. PATENT DOCUMENTS

| 1,397,600 | 11/1921 | Owen ............................ 352/91 R X |
| 3,023,666 | 3/1962 | Smith ............................ 355/46 X |

*Primary Examiner*—Richard A. Wintercorn

[57] ABSTRACT

A process for forming, on a photosensitive support, images presenting a dissolve, this process comprising the steps which consist in forming first and second primary light images by projection on a screen of respective light beams, the light images overlapping and presenting a dissolve, in cutting off the second light beam, in taking a front photograph of the first light image on the photosensitive support by means of an apparatus, in retablishing the second light beam and cutting off the first light beam, in moving the photosensitive support within said apparatus and in taking a front photograph of the second light image.

10 Claims, 11 Drawing Figures

CONTINUOUS PHOTOSENSITIVE SUPPORT PRESENTING A SPATIAL LAP DISSOLVE, ITS APPLICATION, A PROCESS FOR OBTAINING IT AND A DEVICE FOR IMPLEMENTING THE PROCESS

BACKGROUND OF THE INVENTION

The present invention belongs to the general field of photographic recording and relates particularly to a continuous photosensitive support a first and second area of which have been successively and respectively exposed, with a view to undergoing printing, to the action of a first and a second primary light image, these first and second light images being respectively carriers, through their spatial distribution of brilliancy, of a first and a second set of semantic elements reproduced on the support by printing.

The whole of the semantic elements of an image being defined as that of the discernible elements represented by this image, it is known at the present time, in the field of image reproduction, to superimpose two sets of different semantic elements by total overprinting or to pass from one to the other with dissolving or fading.

The superimposition of two sets of different semantic elements may be achieved, on an area of a photosensitive support, in a relatively easy way, simply by printing the same area of this support successively by a first and by a second light image.

On the other hand, passing with dissolving from one set of semantic elements to another cannot, in the present state of the technique, be achieved directly on a photosensitive support. More exactly, the attainment of a dissolving effect between two images requires at present the use of image projection, the dissolve appearing solely between two light images projected successively onto a screen and thus only developing in time.

It is known for example how to achieve a lap dissolve between two fixed images resulting from the projection, onto a screen and by means of two projectors, of two slides. The dissolve is obtained by progressive extinction of the first projector and a synchronized and complementary increase of the power of the second projector.

It is also known how to achieve lap dissolves in cinematographic technique, by superimposing, on each of a number of frames, two images printing the film in a different way, with a brilliancy respectively decreasing and increasing. The dissolving effect only appears at projection and results from the successive character of this projection for the whole of the frames.

OBJECTS AND SUMMARY OF THE INVENTION

In this context, the present invention has as its aim to obtain a dissolve between two sets of semantic elements on the continuous photosensitive support itself, i.e. obtaining a dissolve developing in space.

Thus, a photosensitive support printed in accordance with the invention is characterized in that the first and second areas previously mentioned overlap over a transition zone having been subjected to the successive action of a first part of each of the first and second primary light images, this zone being intermediate between a first and a second surface portion having been subjected respectively to the action of a second part of the first light image and a second part of the second light image, and in that, in this zone, the printing of the semantic elements coming from each of the light images becomes blurred when we move from the surface portion printed by the second part of this image towards the other surface portion.

If the semantic elements coming from the printing of the transition zone by the first part of the first light image are identical to those which come from the printing of this zone by the first part of the second light image, the printing of the photosensitive support has then a semantic continuity along the two above mentioned surface portions and their transition zone.

The process of the present invention comprises the phases consisting of forming the first and second primary light images by projection, on a screen, of two light beams bearing respectively the first and the second set of semantic elements, these light images overlapping on the screen in a brilliancy superimposition zone, in reducing the brilliancy of each of the primary light images in the superimposition zone, by placing shutters in the path of the two light beams until there is obtained on the screen a dissolve of the two primary light images in the brilliancy superimposition zone, in cutting the second light beam and disposing on the same axis a photographing apparatus loaded with said photosensitive support and the first primary light image, in taking a photograph of this first image by means of this apparatus and this support, in reestablishing the second light beam and cutting the first beam, in bringing onto the same axis the photographing apparatus and the second primary light image by relative movement and in moving the photosensitive support, inside the photographing apparatus, over a length connected to said relative movement by a predetermined relation, and in taking a photograph of the second light image by means of this apparatus and this support.

Thus, despite the fact that that has always seemed impossible, the process of the invention enables, from separate negatives and on a photosensitive support of any length, a countryside scene, a site, a town, a monument or any object of any length to be reproduced with a continuity as perfect as in reality.

BRIEF DESCRIPTION OF THE DRAWING

A particular embodiment of the invention will be described hereafter, by way of an indicative example in no wise limiting, with a reference to the accompanying drawings, in which.

DETAILED DESCRIPTION OF THE INVENTION

The present invention concerns the printing of a continuous photosensitive support 1 two areas of which A and B have been successively and respectively exposed to the action of two primary light images designated by a and b. This exposure, from which results the printing of areas A and B, is effected by means of a photographing apparatus and is obviously followed by further treatment of the support, particularly by developing and fixing, which will not be mentioned further because of the conventional character of this treatment.

The distribution of the light intensities of images a and b confers on each of these latter a certain set of semantic elements, (i.e. that these images are each carriers of a set of elements having a proper and defined meaning), this set of semantic elements being transferred, by printing, to the photosensitive support and more exactly to areas A and B.

Figure 1:
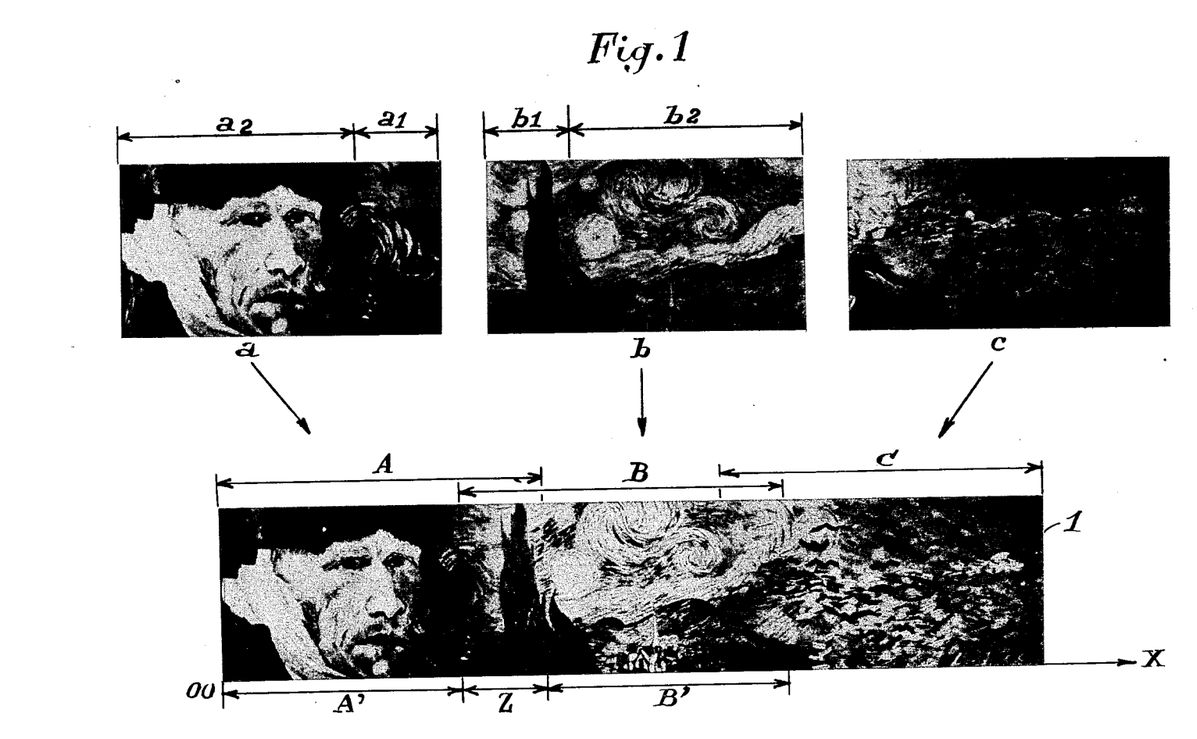
FIGS. 1 and 2 each show three light images on a small scale and a photosensitive support printed, in accordance with the invention, by these light images.
Figure 2:
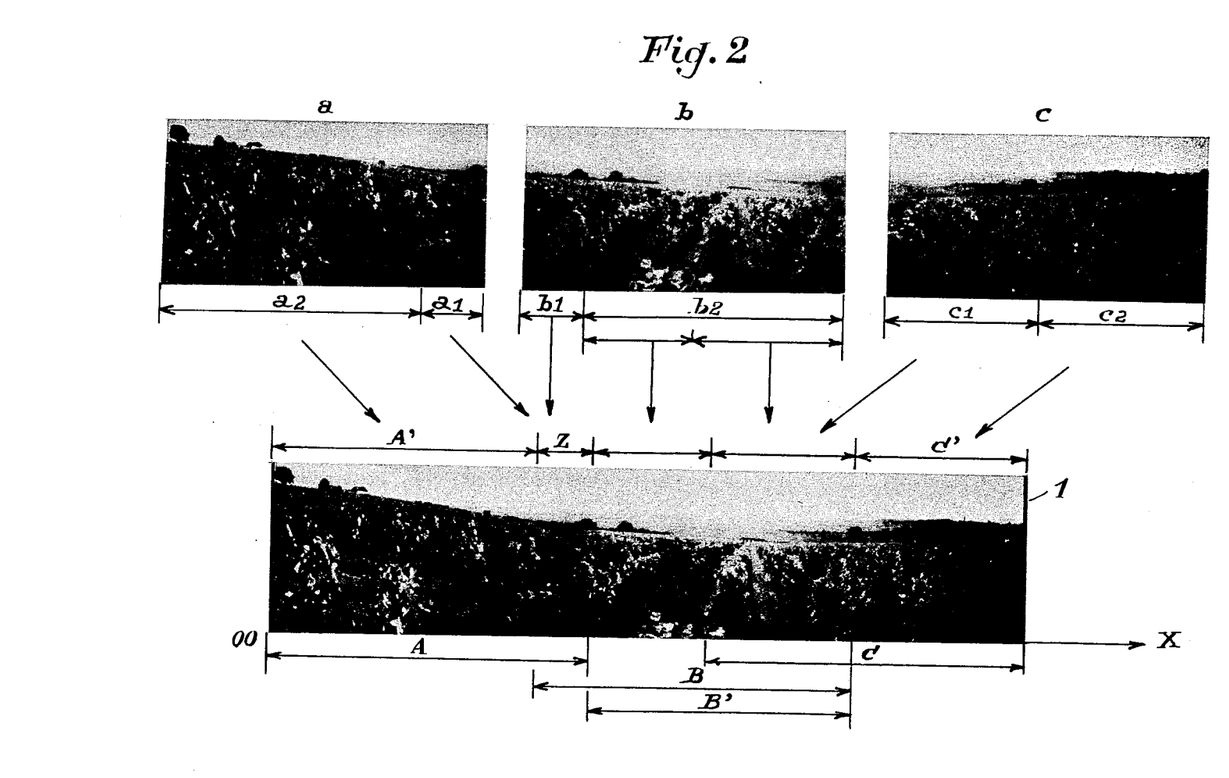

For simplicity's sake, the relative arrangement of images a and b and of support 1 does not take into account, in FIGS. 1 and 2, the image reversal caused by the lens of the photographing apparatus.

According to the invention, areas A and B overlap in a transition zone Z intermediate between two surface portions A′ and B′. Whereas transition zone Z has been successively exposed to a first part $a_1$, $b_1$ of each of images a, b, surface portions A′ and B′ have only undergone exposure, from images a and b, from their second part respectively $a_2$ and $b_2$. In transition zone Z, the printing of the semantic elements carried by each area A, B shades off progressively, from each surface portion A′, B′ towards the other B′, A′, and the resulting printing is homogeneous with that of these surface portions A′ and B′, so that the transition zone Z achieves dissolving, on support 1 itself, between the sets of semantic elements carried by each of surface portions A′ and B′. Thus it is, for example as can be seen in FIG. 1, that the printing, on support 1, of the smoke produced by the pipe, connected in the semantic sense of the term to image a, shades off towards the right, in the direction of surface portion B′ and that the printing of the tail of the luminous curl and of the tree, connected in the semantic sense of the term to image b, shades off towards the left, in the direction of surface portion A′.

FIG. 2 shows a particular case of a photosensitive support the printing of which presents the characteristics mentioned with a reference to FIG. 1. It can be seen, in FIG. 2, representing a vineyard, that the semantic elements (rows of vines) of the first part $a_1$ of the first light image a are strictly identical to those of the first part $b_1$ of the second light image b. There thus exists a semantic continuity from $a_2$ to $b_2$ through $a_1$, identical to $b_1$, this semantic continuity characterizing the printed support 1, which thus carries a continuous image whose length (horizontal direction) is greater than that of each of the exposure areas A and B.

Although, up to now, reference has been made to only two light images a and b and to two areas A and B of the photosensitive support 1, the representation in FIGS. 1 and 2 of three light images a, b and c reproduced by dissolving on support 1, brings out clearly that the number of lap dissolves is not limited.

Figure 3:
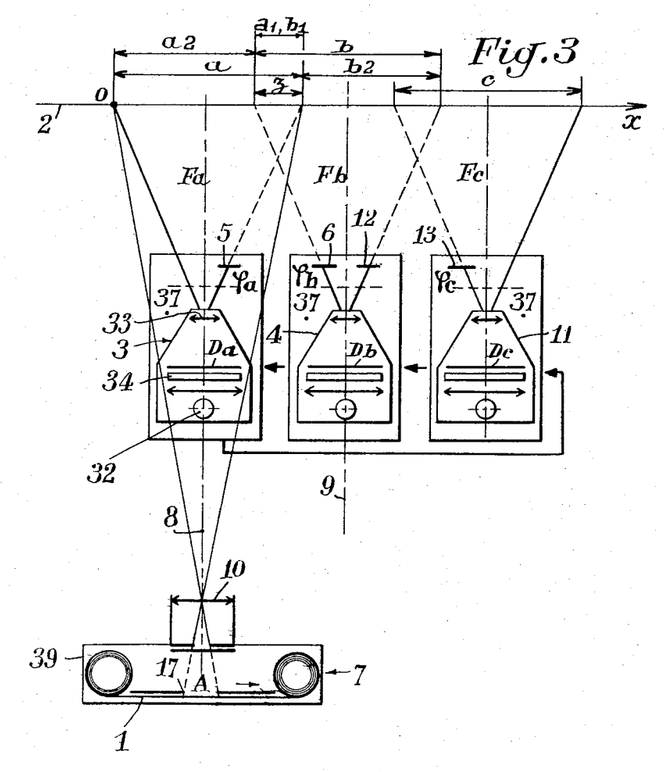
FIG. 3 is a diagram showing the essential elements used in the process of the invention.

The process for obtaining the characteristics previously defined and concerning the printing of the photosensitive support 1 is described with a reference to FIG. 3.

There is formed first of all, on a screen 2, light images a, b by projection of slides $D_a$, $D_b$ by means of projectors 3,4 so that these light images a, b overlap in a zone z of superimposition of brilliancy, i.e. a zone in which the light intensities of the first parts $a_1$ and $b_1$ of these images are added together.

Then, on the edge of beams $F_a$ and $F_b$, carrying images a and b, are placed shutters 5, 6 preferably totally opaque, so as to reduce the light intensity of each of images a and b in the zone of superimposition z. The presence of shutters on the edge of the light beams causes on the screen crossed half-shadows determining progressive reductions of light intensity, and for a suitable position of shutters 5 and 6, these crossed half-shadows are opposed to the light intensity imbalance of the zone of superimposition z, resulting from the superimposition of beams $F_a$ and $F_b$, so that the eye of the operator sees perfect dissolving of images a and b in this zone z. Although the dimensions and the location of shutters 5, 6 may be estimated by the equations presented hereinbelow with a reference to FIG. 4, experience shows that the dimensions of the shutters are not critical and that their position must be determined with respect to the visible effect which results therefrom on the screen.

When the dissolving of light images a and b is achieved, beam $F_b$ is cut off and, without changing the position of the shutters, light image a is used to print area A of the photosensitive support 1. For this purpose, the photosensitive support is obviously loaded in a photographic apparatus 7 whose axis 8 is made to coincide with that of image a.

Then, beam $F_a$ is cut off and beam $F_b$ is reestablished, without modifying the position of shutter 6. Then the photographic apparatus 7 and the second light image b are brought onto the same axis 9. The expressions "the same axis 8" and "the same axis 9" must be taken in the wide sense and referring solely to the two-dimensional representation of FIG. 3. In fact, if the projectors are situated on the same side of screen 2 as apparatus 7, as is the case in FIG. 3, the axis of the light image to be photographed and the axis of apparatus 7 have the same plot 8 but are not mingled in space. Furthermore, although axis 9 has been shown, for the sake of simplicity, as that of image b and although the photographic apparatus 7 may be effectively moved while leaving projector 4 fixed, it will be readily understood that it is preferable, because particularly of the problems of space which would be met with in dissolving numerous images, to leave the photographing apparatus 7 fixed and to move the projector 4. It should however be emphasized that this operation must be carried out without any modification of the position of shutter 6 in relation to beam $F_b$, i.e. in relation to projector 4.

Then, inside the photographing apparatus, the photosensitive support 1 is moved so as to bring area B of the support opposite the exposure window 17 of the photographing apparatus 7. Then, by triggering apparatus 7 and through the lens 10 of this latter, area B of support 1 is printed by light image b, as was previously done for area A.

As is shown in FIG. 3, a third projector 11 and shutters 12, 13 could be used to achieve, before printing of area B and for example at the time of realizing the dissolve between light images a and b, a dissolve between images b and c.

The successive printing of support 1 by images a, b and c without modification of the position of shutters 5, 6, 12, 13 has the effect shown in FIGS. 1 and 2. It will be readily understood that after printing of support 1 by image b and before its printing by image c, it would be possible to recycle projector 3, possibly loaded with another slide $D_d$, to interpose shutters respectively on the right of beam $F_c$ and on the left of beam $F_d$, corresponding to the projection of slide $D_d$, so as to achieve on the screen a dissolve between images c and d and to print successively support 1 by images c and d so as to obtain four dissolved images on support 1, the procedure described being able to be extended indefinitely by recycling the projectors or, although much less reliable, by transfer of the slides and of the positions of the shutters from one projector to the other.

Figure 4:
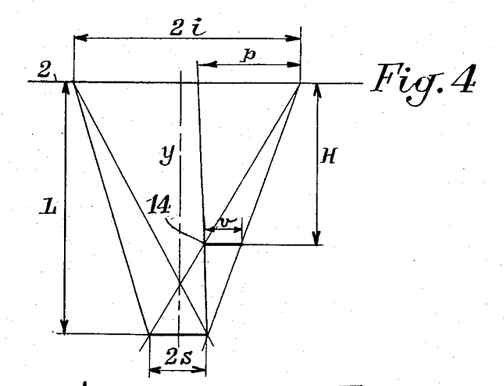
FIG. 4 is a diagram showing the sizes taken into consideration for calculating the position of the shutters.

FIG. 4 is a diagram representing by $2i$ the width of an image projected on screen 2 by means of a true light source of width $2s$. A shutter of length v is placed in the projection beam and produces on the image a half-shadow of length p; the source and the screen are separated by a distance L; the shutter is parallel to the screen and its end 14 is at a distance H from the screen.

It can be shown that to produce a half-shadow of length p, the shutter must be disposed so that:

$$H = \frac{L \cdot p}{2s + p},$$

the shutter then having to have a minimum length $$V = \frac{2s \cdot p}{2s + p},$$

and the distance between end 14 of the shutter and axis y of the optical system having to have the value $$\frac{s(2i - p)}{2s + p}.$$

Since the largest half-shadow foreseen has a length $2i$, the minimum length which the shutter must have to form this half-shadow is $$\frac{2i \cdot s}{i + s}.$$

As it is obviously convenient to have only one type of shutter to provide all the half-shadows desired, it is preferable to give all the shutters used a length equal to or greater than $$\frac{2i \cdot s}{i + s}.$$

The preceding results enable the length to be given to the shutters to be determined and provide an estimate of their position.

However, they cannot adequately replace the visual examination of the dissolve, created on the screen, between two light images.

Figure 5A:
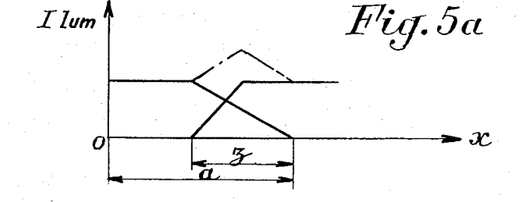
FIGS. 5a and 5b are graphs showing two types of aberration which it is advisable to avoid in the practice of the invention.

It appears in fact that any error in the length of the crossed half-shadows forming the dissolve will result on the screen in an observable light accident. This phenomenon is brought out on the graph of FIG. 5a which shows on the X-axis the distance x separating a current point of the screen from a reference point O (see FIG. 3) and on the Y-axis the average light intensity I lum of images a and b projected on the screen. The resulting light intensity, shown by a dot-dash line, presents a maximum which impairs the dissolve.

Figure 5B:
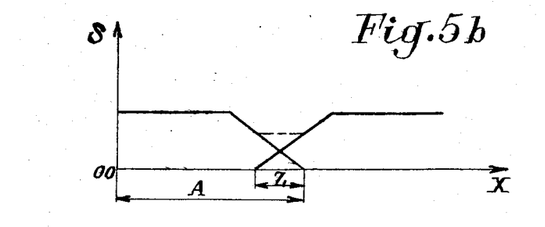

The graph of FIG. 5b brings out another type of accident, appearing this time on the support. This graph shows on the X-axis the distance X separating a current point of the photosensitive support 1 from a reference point OO and on the Y-axis the optical density $\delta$ of areas A and B after development of the negative photosensitive support. In the zone of transition Z can be seen an accident of the resultant of the densities, shown by a dash line, coming from an error of movement of the photosensitive support in the photographing apparatus between the printing of areas A and B. If we call the reproduction ratio of apparatus 7 the ratio of the length of area A to that of light image a and if the images a and b have the same length, it will be readily understood that the movement of translation which support 1 must undergo in apparatus 7 between the printings of a and b, has for modulus a length equal to the product, by the reproduction ratio, of the difference between the lengths of image a and of the zone of superimposition z, this movement of translation having a direction opposite that of the relative movement of the projector 4 in relation to apparatus 7 because of the reversal of the image by lens 10. However, experience has shown that the accuracy of this movement of translation must be high, so as to avoid accidents such as those in FIG. 5b.

The process described above, for obtaining dissolves between light images, only makes reference to the direct visual observation of these images. Such as described up to present, this process effectively enables in numerous cases, perfect dissolves to be obtained on the support, similar to those of FIGS. 1 and 2. However, this process has proved sometimes to lead to aberrations, more particularly when the light images had substantially different light intensities. The explanation of the underlying parasitic phenomenon and the means for palliating it are given below.

Figure 6:
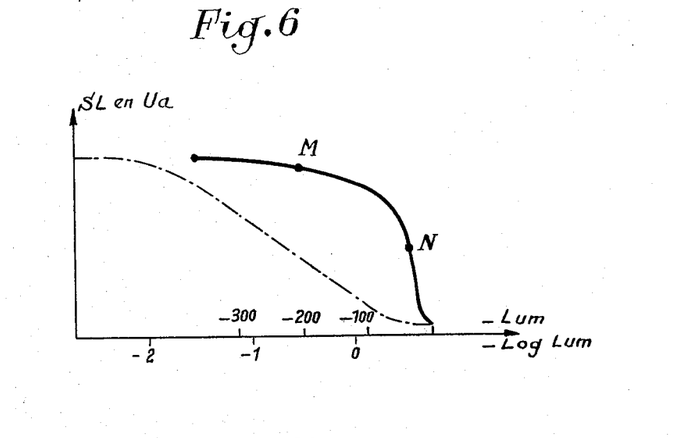
FIG. 6 is a diagram showing schematically the response curve of the human eye to light stimulation.

FIG. 6 is a very schematical graph showing on the Y-axis a light sensation SL, expressed in arbitrary units $U_a$ and showing the intensity of the response of the eye of an observer to a light image, and on the X-axis on the one hand a scale giving the opposite of the logarithm of the brightness of this image ($-$Log lum), to which there corresponds the curve shown by a dot-dash line and, on the other hand, a scale giving directly the opposite of the brilliancy of this image-(lum), to which there corresponds the curve shown by a continuous line. FIG. 6 has no other purpose but to convey the fact that the eye tends to assimilate different light areas to each other, when they are either very strongly or very weakly lit up, i.e. that the eye attenuates the contrast of a strongly or weakly lit subject.

Figure 7A:
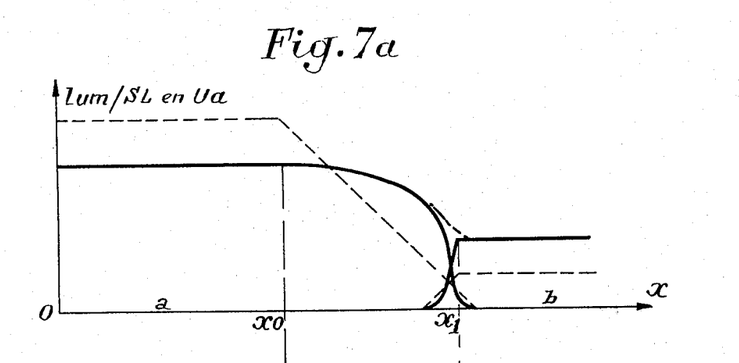
FIGS. 7a and 7b are diagrams showing the response of the human eye to the different brightness of two images projected onto the screen.

FIG. 7a is a graph showing on the X-axis the distance x (FIG. 3) and on the Y-axis, on the one hand, the brilliancy lum (dotted line curve), on the other hand the light sensation $S_L$ (continuous line curve), each expressed in arbitrary units $U_a$ and relative to two light images a and b projected on the screen, of substantially different brilliancy. This figure corresponds to the attainment of a perfect visual dissolve, as is shown by the resultant of light sensation represented by a dash line. The light sensations at points $x_0$ and $x_1$ correspond for example to those of points M and N in FIG. 6, $x_0$ marking the beginning of the half-shadow of image a and $x_1$ the point where the brilliancy of the half-shadow has reached the brilliancy of image b.

Figure 7B:
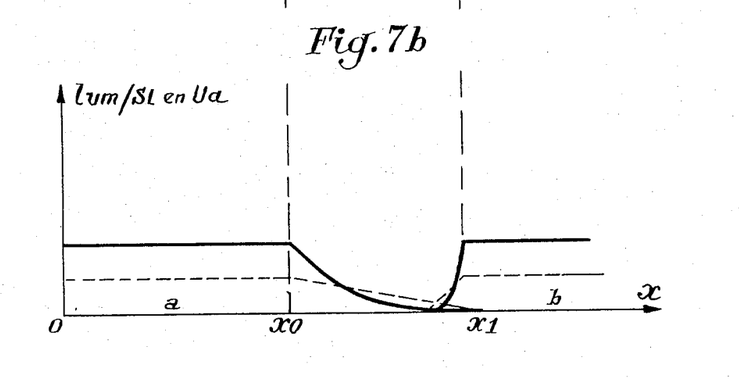

If a neutral grey filter $\Psi_a$ is placed in the path of beam $F_a$ so as to adjust the brilliancy of a to that of b, the light sensation at point $x_0$ will become that which characterized point N and the variations of brilliancy and of light sensation with a respect to x will be those shown in FIG. 7b, the examination of which shows clearly that the visual dissolve between images a and b is destroyed.

Now, it is known that photosensitive supports have a response curve, expressed in optical densities (Y-axis) with respect to the opposite of the logarithm of the lighting amounts or illumination received by the support (on the X-axis), of the type shown in FIG. 6 by a dot-dash line.

If, therefore, the operator having obtained the visual dissolve shown in FIG. 7a wishes to obtain, on the photosensitive support, two areas A and B of closely related average optical density, which he achieves for example by reducing the exposure time of area A in relation to that of area B, there will occur on support 1 an aberration similar to that which is shown in FIG. 7b.

This aberration may, in accordance with the invention, be avoided by simulating more strictly still, by means of visual phenomena entering into the observation of a dissolve between two light images, the physico-chemical phenomena taking place on the photosensitive support at the time of its printing by these images.

This greater strictness in the simulation implies necessarily, before attainment of the dissolve, the equalization of the brilliancy of the light images which it is desired to transfer with the same average light value to the photosensitive support, and suggests the use of a contrast filter, through which the operator observes the dissolve between light images, and whose optical characteristics are adapted, in a way known per se, to the characteristics of the type of photosensitive support used, so as to bring into very close relation the response curves of the human eye, on the one hand, and of the photosensitive support on the other.

Experience has shown that this process gives excellent results particularly with so-called "soft" photosensitive films, i.e. those in which the slope of the rectilinear part of the response curve (optical densities with a respect to the logarithm of the illuminations), also called gamma ($\gamma$) curve, is less than or equal to 1.

In its most elaborated embodiment, exposed herebelow, the process of the invention eliminates then this type of aberration.

Let us assume that it is desired to reproduce on a photosensitive support, with the same light value and with a dissolving effect between each image, the images carried by n different slides. It is advisable first of all to determine, by a measure of brilliancy known per se, the brilliancy of each light image coming from the projection of each slide on screen 2. There can be deduced therefrom, in a way also known, the density of the neutral filter to place in the beam of each image so that n light images have the same brilliancy, for example that of the image having the lowest brilliancy.

We then use the process previously described with a reference to FIG. 3 by creating on the screen the two dissolves between the first three light images a, b, c brought to the same brilliancy by means of neutral filters $\Psi_a$, $\Psi_b$, $\Psi_c$ interposed in their respective projection beam $F_a$, $F_b$, $F_c$, these dissolves being very preferably observed through the contrast filter previously mentioned.

It is then possible to print successively the different areas of support 1 as indicated previously, either by leaving the neutral filters in position and by conserving the same exposure time and diaphragm stop values for photographic apparatus 7, or by withdrawing the filters after obtaining the visual dissolves and by reducing the exposure time or diaphragm stop as an increasing function of the optical density of the withdrawn filters, so as to maintain contant the average illuminations of the different negatives.

Since the dissolves are created after equalization of the brilliancy, it must not be forgotten that the half-shadows formed have themselves an influence on these brilliancies. It is then advisable, particularly if very elongated half-shadows are used, to check also a posteriori the homogeneity of the brilliancies of the images. Because of the influence of one image on the other, it is also preferable to create dissolves on three light images, a fourth image being even sometimes desirable.

A photographic apparatus usable with the invention must be able to allow movements of the photosensitive support over a length less than that of an exposure area A, with an accuracy of at least 1/10 of a millimeter.

The photographic apparatus 7 is then an apparatus provided, apart from conventional parts shown or not (FIG. 8), such as a case 39 and a lens 10 (FIG. 3), a delivery magazin 15 and a receiving magazin 16, an exposure window 17, and driving drums 18, 19, with extra elements such as a toothed belt 20 engaged with pulleys 21, 22 integral with the shafts of the drums, a centimetric and millimetric motion gear 23 and deci- and centi-millimetric motion gears 24 to 26 associated with dials 27, 28, these gears being engaged with a pinion 29 integral with the shaft of drum 19. Preferably, a system of electromagnetic locking 30 is provided to lock the assembly of gears in any selected position.

Figure 8:
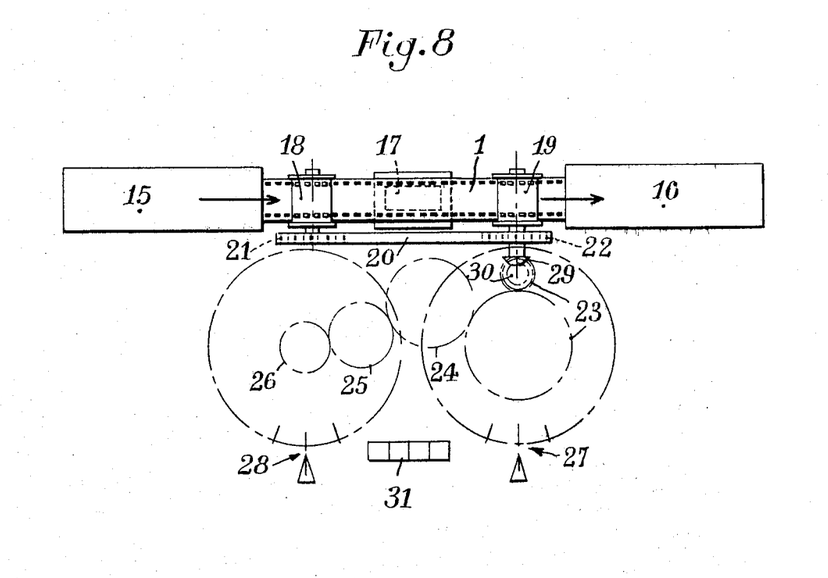
FIG. 8 is a diagram of a photographing apparatus usable with the invention.

The photosensitive support 1 is stretched by a torque effect, obtained by any adequate means, exerted on the winding reels (not seen) inside magazins 15, 16. In comparison with conventional photographic apparatus, the apparatus 7 of the invention allows a reverse movement of the support, the delivery magazin becoming receiver and conversely. A summing counter 31 is provided for allowing constant and unequivical locating of any area of support 1.

The photographic apparatus is set in a fixed position in relation to screen 2 (FIG. 3).

The projectors used for the invention are commercial projectors, having however excellent optical qualities, in which there is inserted, between lamp 32 and lens 33 (FIG. 3), a frosted glass strip 34 or any other optical element serving as diffuser and allowing half-shadows to be obtained free from any diffraction fringe as well as a lowering of the contrast of the image projected onto the screen.

Figure 9:
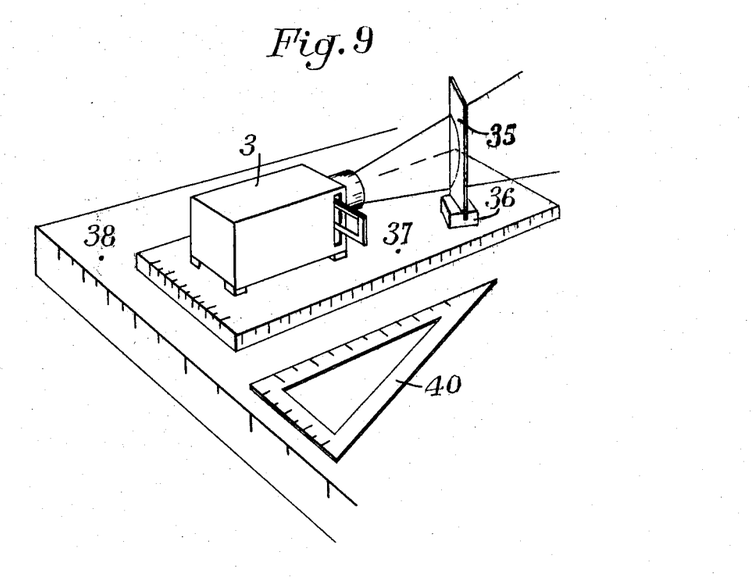
FIG. 9 is a schematical view in perspective of a bench and a projector usable with the invention.

Shutters 5, 6, 12, 13 are for example formed by rectangular metal blades 35, mounted vertically on a base 36.

Each projector is fixed on a platform 37, all the platforms having the same dimensions, provided with marks for their positioning, by means of a square 40 for example, and being selectively movable on balls or lockable by means of electromagnetic locking on a bench 38. The shutters associated with each projector are also movable and fixable on the respective platform. For this purpose, it is for example provided that the upper surface of the platform and the bases 36 of the shutters are mutually attracted by magnetization.

The passage from one light image to the other is thus obtained by simple movement of platforms 37 on bench 38. In this way are eliminated the troublesome consequences which may arise from differences in construction of the projectors, in the positioning of the slides, in the illumination of the lamps, in the relative positions of the shutters, etc. . . .

The invention is applicable in all cases where the image is an information, training, advertising, entertainment, fixed or mobile decoration, architectural or scenic vector, or else to serve as a background for cinematographic shooting. Since a small length of film is sufficient to convey a large number of images which, associated with each other, may restore a lesson, a reasoning, a description, or any narrative, the invention enables information to be circulated in the most varied fields and at a low cost price. This advantage is reinforced by the fact that a photosensitive support printed in accordance with the invention may be read directly by means of a magnifying glass or a viewer with a magnifying glass.

It is of course to be understood that the embodiment described above has been given by way of example and that modifications may be made thereto by a man skilled in the art without departing from the spirit of the invention.

What is claimed is:

1. A process for forming on a photosensitive support successive images having a dissolve therebetween and derived from at least two primary light images in overlapping, partially merging areas, comprising the following steps:
   (a) forming first and second primary light images on a screen while overlapping said images in part to form an area of superimposed brilliancy between said images;
   (b) reducing the brilliancy of each of said primary light images in said area by interposing shutters in the paths of merging portions of the light beams forming said successive images to create a dissolve therebetween;
   (c) extinguishing said second light image;
   (d) disposing a photographic apparatus loaded with said photo-sensitive support in an axis coextensive with that of said first primary light image;
   (e) exposing said photosensitive support to said first primary light image to form thereon a secondary image;
   (f) extinguishing said first light image and re-establishing said second light image;
   (g) adjusting said photographic apparatus to an axis coextensive with that of said second primary image by relative movement therebetween;
   (h) advancing said photosensitive support within the photographic apparatus over a predetermined distance corresponding substantially to said relative movement; and
   (i) exposing said photosensitive support to said second primary light image to complete a secondary image with a dissolve between the successive primary images.

2. A process according to claim 1, wherein the intensity of the light between successive images is equalized and colorimetrically balanced.

3. A process according to claim 1 or claim 2 wherein said shutters are opaque.

4. The process as claimed in claim 1, wherein a secondary image is formed from two primary images presenting at their adjacent edges common semantic elements so as to obtain, on the photosensitive support, the continuous representation of an object, over a length greater than that of an exposure area of a photographic apparatus.

5. The process as claimed in claim 1, wherein a secondary image is formed from two primary images having on their adjacent edges different semantic elements.

6. A photosensitive support obtained by the process of claim 4, from a plurality of primary images.

7. A photosensitive support as obtained by the process of claim 5, from a plurality of primary images.

8. A system for providing an image dissolve on a continuous photosensitive support comprising a projection screen, at least two projectors for projecting, respectively, successive light images on said screen in overlapping, partially merging areas, at least two opaque shutters disposed between said projectors and said screen to reduce the brilliancy of the projected images in said overlapping areas, a photographic apparatus containing a moveable photosensitive support for receiving exposures from said light images, means within said apparatus for moving said support to positions to facilitate exposure thereof to overlapping successive images, and means for relative movement between said projectors and said photographic apparatus to permit exposure of successive images.

9. A system according to claim 8, wherein each of the projectors and corresponding shutters are fixed on separate platforms, respectively, each said platform being moveable on a base to position the corresponding projector without movement of the shutter with respect to the projector.

10. A system according to claim 8 or claim 9, wherein a frosted glass strip is inserted as a diffuser in each projector.

* * * * *